(12) United States Patent
Pratt

(10) Patent No.: US 7,514,051 B2
(45) Date of Patent: Apr. 7, 2009

(54) PROCESS FOR MAKING HIGH PURITY SODIUM SULFATE

(75) Inventor: Matthew Pratt, Boss, MO (US)

(73) Assignee: The Doe Run Resources Corporation, St. Louis, MO (US)

( * ) Notice: Subject to any disclaimer, the term of this patent is extended or adjusted under 35 U.S.C. 154(b) by 217 days.

(21) Appl. No.: 11/258,376

(22) Filed: Oct. 25, 2005

(65) Prior Publication Data

US 2006/0163164 A1    Jul. 27, 2006

Related U.S. Application Data

(60) Provisional application No. 60/621,986, filed on Oct. 25, 2004.

(51) Int. Cl.
*C01B 17/96*   (2006.01)
*C01D 5/00*    (2006.01)

(52) U.S. Cl. .................. 423/199; 423/551; 23/302 T
(58) Field of Classification Search .............. 423/199, 423/551; 23/302 T
See application file for complete search history.

(56) References Cited

U.S. PATENT DOCUMENTS

| | | | | |
|---|---|---|---|---|
| 2,468,803 A | * | 5/1949 | Bonnet et al. | ............... 423/184 |
| 4,259,082 A | * | 3/1981 | Gianforcaro et al. | ........ 23/302 T |
| 4,269,810 A | * | 5/1981 | Kolakowski | ................ 423/92 |
| 5,108,625 A | * | 4/1992 | Erga | ............................ 210/767 |
| 5,783,084 A | * | 7/1998 | Suenkonis | ................... 210/638 |
| 5,871,551 A | * | 2/1999 | Rodriguez-Leon | ........ 23/302 T |
| 6,177,056 B1 | * | 1/2001 | Prengaman et al. | ......... 423/199 |
| 6,652,603 B2 | * | 11/2003 | Babjak et al. | .............. 23/302 T |

* cited by examiner

*Primary Examiner*—Timothy C Vanoy
(74) *Attorney, Agent, or Firm*—Harness, Dickey & Pierce, P.L.C.

(57) ABSTRACT

A method for purifying heavy metal impurities (such as antimony, arsenic, iron, cadmium, and lead) from 28 to 38 weight percent aqueous crude sodium sulfate solution is achieved by adding ferric sulfate to the aqueous crude sodium sulfate solution to form a suspension, progressively neutralizing the suspension from a pH of less than 3.5 up to at least 6, and separating the ferric-sulfate-nucleated precipitate from the suspension. An oxidizing agent such as peroxide is optionally added to the suspension to augment adsorption of the heavy metals.

34 Claims, 1 Drawing Sheet

PROCESS FOR MAKING HIGH PURITY SODIUM SULFATE

This application claims the benefit of the filing date of U.S. Provisional Patent Application 60/621,986 filed on Oct. 25, 2004, the disclosure of which is hereby incorporated herein by reference.

INTRODUCTION

This invention relates to the processes for the purification of sodium sulfate-containing solutions. In particular, the present invention provides processes for the removal of heavy metal ions from sodium sulfate solutions.

Sodium sulfate has a variety of commercial uses, including in pulp and paper products, and in various consumer products (e.g., soaps, carpet fresheners) and foods. Sodium sulfate crystals for many such uses must meet food grade criteria respective to heavy metal concentration, preferably containing such metals at a concentration of less than 10 parts per million (ppm).

The raw material for sodium sulfate is mostly from mining discharge or scrap batteries. These raw materials typically contain heavy metals, which must be removed in order to produce commercially useable sodium sulfate. Heavy metals generally include metals and metalloids having densities of 4.5 gm/cm$^3$ or greater. Heavy metals have specified minimum concentrations in many food products respective to both toxicity research and derived regulations of governing bodies such as the United States Food And Drug Administration (FDA).

A number of processes have been used for deriving sodium sulfate from these feed materials. Some industrial methods use sulfide precipitation with sodium sulfide and other typical sulfide based chemicals. These approaches remove lead and some other heavy metals but are not as effective in removing metalloids such as arsenic or antimony. Another method involves desulfanation of battery muds with alkali metal salts or alkali metal hydroxides. Another method involves scrubbing $SO_2$ from smelting off-gas using a soluble alkaline material such as Na(OH), oxidizing derived sulfite solution to sulfate, adjusting pH with $H_2SO_4$, adding ferric sulfate as a co-precipitant, and removing heavy metals with a series of staged increases in pH to precipitate heavy metals. See, U.S. Pat. No. 4,269,810, Kolakowski, issued May 26, 1981; and U.S. Pat. No. 6,177,056, Prengaman, et al., issued Jan. 23, 2001. Such methods are deficient in one or more regards, including failure to produce commercially useful materials (i.e., having sufficient purity), and production of undesirable by-products.

SUMMARY

The invention provides a method for purifying aqueous crude sodium sulfate solution having from about 28 weight percent to about 38 weight percent sodium sulfate (and at least one heavy metal impurity selected from the group of metals consisting of antimony, arsenic, iron, cadmium, lead, and combinations thereof) by:
(a) adding ferric sulfate to the aqueous crude sodium sulfate solution to form a suspension;
(b) progressively neutralizing the suspension from a pH of less than about 3.5 to a pH of greater than about 6 to form precipitate of ferric sulfate and at least one heavy metal impurity; and
(c) separating the precipitate from the suspension.

In other aspects of the invention, the suspension is agitated at sustained pH values to adsorb particular heavy metals in the set of various heavy metal impurities of antimony, arsenic, iron, cadmium, and lead. In a particular aspect of the invention in this regard, antimony and/or arsenic are adsorbed to ferric-sulfate-nucleated precipitate at a pH of less than 3.5. In various embodiments, the pH is adjusted with ferric sulfate, sulfuric acid, and sodium hydroxide.

In yet another aspect of the invention, an oxidizing agent such as peroxide is added to the suspension to augment the adsorbing of heavy metals to precipitate nucleated by ferric sulfate.

The present invention affords benefits over methods among those known in the art. Such benefits include one or more of manufacturing sodium sulfate manufacture without generation of hydrogen sulfide gas, improved quality of product, improved efficiency, and reduced cost. Further areas of applicability will become apparent from the detailed description provided hereinafter. It should be understood that the detailed description and specific examples, while indicating embodiments of the invention, are intended for purposes of illustration only and are not intended to limit the scope of the invention.

BRIEF DESCRIPTION OF THE DRAWINGS

The present invention will become more fully understood from the detailed description and the accompanying drawing of FIG. 1, an apparatus for contacting sodium sulfate crude solution with ferric sulfate, controlling the pH, and filtering the suspension of precipitate (based on the ferric sulfate) and the liquid media of the suspension.

It should be noted that the figure set forth herein is intended to exemplify the general characteristics of an apparatus, materials and methods among those of this invention, for the purpose of the description of such embodiments herein. This figure may not precisely reflect the characteristics of any given embodiment, and is not necessarily intended to define or limit specific embodiments within the scope of this invention.

DESCRIPTION

Figure 1:
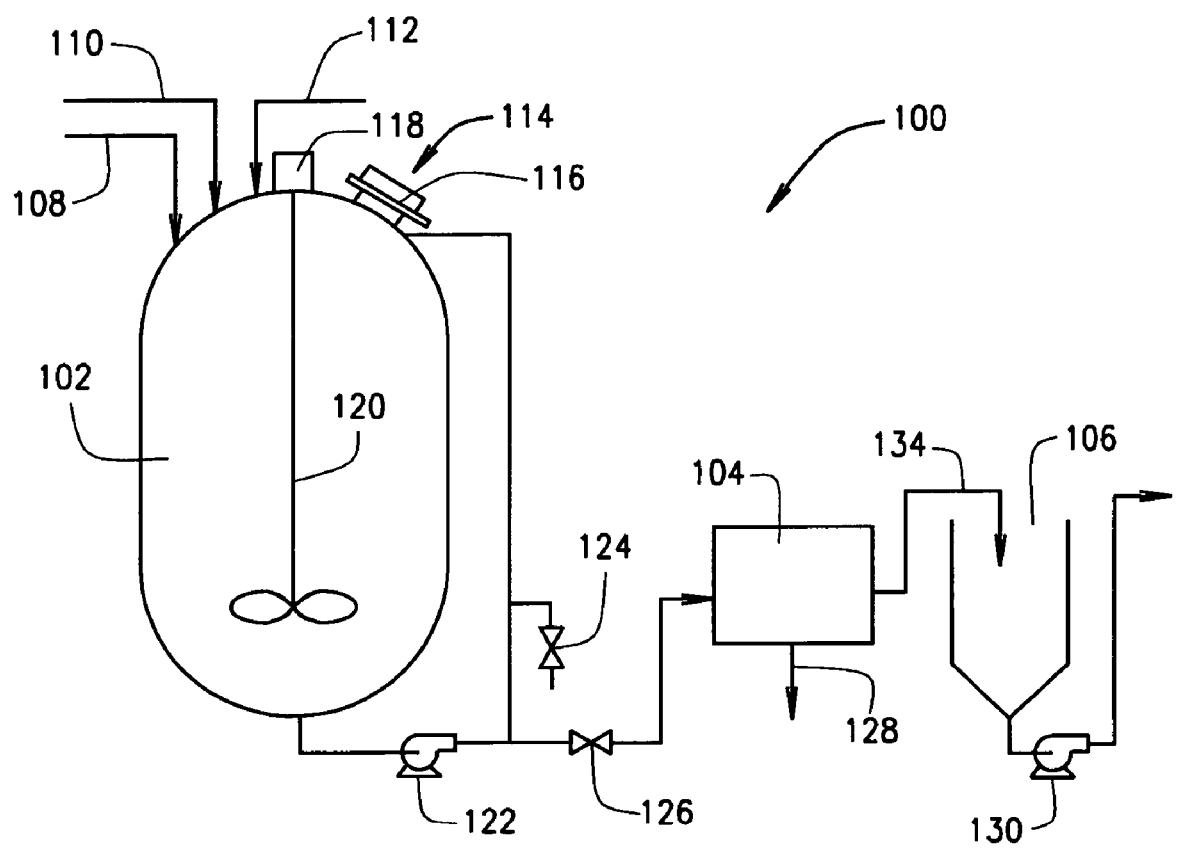

The following definitions and non-limiting guidelines must be considered in reviewing the description of this invention set forth herein.

The headings (such as "Introduction" and "Summary") used herein are intended only for general organization of topics within the disclosure of the invention, and are not intended to limit the disclosure of the invention or any aspect thereof. In particular, subject matter disclosed in the "Introduction" may include aspects of technology within the scope of the invention, and may not constitute a recitation of prior art. Subject matter disclosed in the "Summary" is not an exhaustive or complete disclosure of the entire scope of the invention or any embodiments thereof.

The citation of references herein does not constitute an admission that those references are prior art or have any relevance to the patentability of the invention disclosed herein. All references cited in the Description section of this specification are hereby incorporated by reference in their entirety.

The description and specific examples, while indicating embodiments of the invention, are intended for purposes of illustration only and are not intended to limit the scope of the invention. Moreover, recitation of multiple embodiments having stated features is not intended to exclude other embodiments having additional features, or other embodiments incorporating different combinations the stated of features.

As used herein, the words "preferred" and "preferably" refer to embodiments of the invention that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention:

As used herein, the word "include," and its variants, is intended to be non-limiting, such that recitation of items in a list is not to the exclusion of other like items that may also be useful in the materials, compositions, devices, and methods of this invention.

This invention relates to purification of sodium sulfate to food grade quality, and, more particularly, to a method of reducing heavy metal (heavy metal ion) content in a concentrated solution of from about 25 to about 40, preferably from about 28 to about 38, weight percent sodium sulfate in water. Generally, preferred embodiments of this invention involve admixing ferric sulfate into the sodium sulfate solution under conditions suitable to precipitate at least some of the heavy metal and then filtering the resulting suspension to remove precipitate.

While heavy metal removal from sodium sulfate solutions has been achieved for some time (see Introduction), efficacy of ferric sulfate in achieving food grade quality sodium sulfate is a surprising find. In this regard, food grade sodium sulfate crystals must meet the specification of a maximum of only 10 parts per million of heavy metal, and iron (existing as ferric and/or ferrous ion in solution) is a heavy metal. Ferric sulfate nucleated precipitation in concentrated sodium sulfate had not been anticipated as useful for ultimately achieving such levels of heavy metal purification according to belief that some iron would disassociate from the ferric sulfate under such conditions to raise the heavy metal concentration in the sodium sulfate solution and thereby frustrate achievement of the desired heavy metal purity in the sodium sulfate product. In the described embodiments, however, iron surprisingly does not disassociate from the ferric sulfate in such a way as to raise the heavy metal concentration in the sodium sulfate solution to an unacceptable level for desired heavy metal purity in food-grade sodium sulfate product. In this regard, it is believed that either (a) the ferric sulfate does not actually sufficiently disassociate from ferric sulfate when in concentrated aqueous sodium sulfate, or (b) iron disassociating from the ferric sulfate is promptly adsorbed "back" to the precipitate nucleated by the ferric sulfate in accordance with the described embodiments.

In one embodiment the pH content of the solution is incrementally increased from a level of less than about 3.5 (preferably 3, and more preferably 2) and the solution is agitated for a sufficient time to facilitate movement toward equilibrium conditions at each increment of pH to enable adsorption of heavy metal from the solution onto the precipitate nucleated by the ferric sulfate. In one embodiment, the liquid media of the suspension is preferably contacted with the ferric-sulfate-nucleated precipitate in the presence of an oxidizing agent such as $H_2O_2$ to maintain the oxidation state of the heavy metal ions toward a favorable valence for rapid adsorption to the ferric sulfate. In yet another embodiment, increase in suspension pH is achieved with sodium hydroxide (also identified as "caustic soda" or "caustic").

The embodiments effect removal of heavy metal ions from the concentrated sodium sulfate solution by contacting the solution with ferric sulfate at a pH effective for capture of the selected heavy metal ion by the ferric sulfate by-product precipitate; these heavy metals include antimony, arsenic, lead, iron, and cadmium. The removal of these impurities yields a substantially pure sodium sulfate solution that is then evaporated or otherwise dehydrated to form substantially pure sodium sulfate.

Antimony, arsenic, lead, iron, and cadmium (Sb, As, Pb, Fe, and Cd) generally exist in aqueous solutions as positively-charged ions (cations). Any of these cations in concentrated sodium sulfate solution attach via absorption to the (negatively charged) anionic ferric sulfate through attraction of charges. The process is sensitive to pH-range for most heavy metals of concern, so selective (progressive) removal of desired heavy metal ions into the precipitate from the liquid medium of the sodium sulfate and ferric sulfate suspension is achieved by varying the pH of the suspension to higher values in increments and then agitating the suspension for a period of time at each increment of pH to drive the equilibrium of heavy metals which are favored for adsorption at that pH to the precipitate. Crude feed aqueous solutions suitable for use with the embodiments include all types of $Na_2(SO_4)$ solutions, including, for example, solutions from secondary lead sodium sulfate plants, primary sodium sulfate mining operations, or any sodium sulfate purification plant.

In general overview of the one embodiment, ferric sulfate is added first (e.g., a 5 gallon bucket of ferric sulfate is poured into a 1000 gallon reaction vessel holding the concentrated sodium sulfate solution) and then the pH of the suspension is checked. Contact between the solid and liquid phases of the suspension is achieved by stirring the ferric sulfate for an extended period of time. It should be noted that the amount of ferric sulfate needed does not depend specifically on molar ratios. In this regard, the adsorption of heavy metal to the precipitate proceeds with an attractive mechanism between charges, but specific electron pairing between atoms is not required as when atoms are combined into molecules. Tradeoffs in the amount of ferric sulfate added to a concentrated sodium sulfate solution batch are, however, related to several factors. The time needed for establishing effective equilibrium of heavy metals (which are favored for adsorption at a particular pH) between the liquid media of the suspension and the precipitate of the suspension will diminish with a greater relative amount of ferric sulfate; however, a greater amount of ferric sulfate ultimately will also provide a smaller precipitate particle after the heavy metal impurity has been acceptably absorbed. Variation in vessel geometry, agitation efficiency, batch-to-batch crude $Na_2(SO_4)$ solutions characteristics (such as, for example, the concentration of $Na_2(SO_4)$, the particular heavy metal mix in a batch, or the concentration of a particular heavy metal in a batch), and even time available for the operating technician to process a particular batch all impact the particular amount of ferric sulfate added to a batch. In this regard, some sampling and analysis of the suspension during the course of heavy metal adsorption is preferred to both (a) enable measurement of the efficacy of the ferric sulfate which has been added to the particular batch and (b) appropriate adjustment of the ferric sulfate amount if, in the judgment of the operating technician, such is needed.

Respective to ferric sulfate adjustment, additional ferric sulfate can be readily added to a batch to increase the amount. In cases where less ferric sulfate is desired, the batch can be filtered and then recharged for an essential restart of the heavy metal removal process from a pH of less than about 3.5 or a recommencement of the heavy metal removal process at a pH of greater than 3.5. In yet another embodiment, effectively less ferric sulfate can be achieved by adding additional crude sodium sulfate solution.

The pH is adjusted during the course of removing heavy metal from a batch within a general range of from about 2 to about 9, depending on the target metal in solution, preferably by the addition of caustic. Table 1 shows optimum pH values for precipitation of various metals from suspensions of ferric sulfate in concentrated aqueous sodium sulfate having from about 28 to about 38 weight percent sodium sulfate. Note the surprising find that metalloids As and Sb both require a relatively low pH for the treatment to be effective. In this regard, acid addition may be required for some batches depending on the contaminant levels of the incoming sodium sulfate solution.

TABLE 1

Optimum pH for the adsorption of metals

| Element | Optimum pH |
|---|---|
| Fe | 2-9 |
| Pb | 2-9 |
| As | 2-3 |
| Sb | 2-3 |
| Cd | 2-9 |

The suspension is agitated (stirred), but the suspension generally does not require heating for the adsorption to proceed. Agitation promotes adsorption and co-precipitation reactions to occur. After the adsorption reactions have been complete, the precipitate is then filtered. While a number of well-known separation methods are used in various embodiments to separate the liquid sodium sulfate from the solid pregnant ferric sulfate, a preferred approach employs use of a plate and frame filter press.

In one embodiment, an oxidizing agent such as hydrogen peroxide ($H_2O_2$) is added to at least one progressive neutralization "stage" of the process to ensure that the metalloids are driven to oxidation states most conducive for adsorption (usually the highest positive valence state for the particular heavy metal of interest). For instance, Sb may exist in trivalent or pentavalent form, and the peroxide augments the pentavalent form.

In this regard, the type of Sb valence prevalent in a solution depends on the pH of the solution. Sb in pentavalent form exists in a hydroxide form as such, $Sb(OH)_6^-$. Trivalent Sb has no such negative charge. Only pentavalent antimony appears to adsorb to the ferric sulfate precipitate.

As a further benefit, peroxide addition provides visually snow white sodium sulfate crystals which are desired in some food grade applications.

As should be appreciated by those of skill, parameters such as pH, conditioning time, ferric sulfate particle size, and initial heavy metal ion concentration (or ratio of ferric sulfate to solution) are optimized for particular batches or for a batch series (a series of batches respective to a particular source of crude sodium sulfate solution) to maximum heavy metal ion removal from the crude solution.

Before filtering, the pH of the suspension must be raised above a value of about 6. While this has several general benefits, the elevation of pH above about 6 reduces trace amounts of Fe from the suspension.

As previously overviewed, the methods of the various embodiments of this invention can be used for reduction of heavy metal ions in sodium sulfate suspension by varying conditions to favor removal of a selected heavy metal ion and inhibiting removal of other heavy metal ions. Additional specifics in this regard and progressive neutralization of the suspension are outlined in the following paragraphs.

Low pH, of about 3.5 (preferably, of less than 3.5, and, more preferably, of from about 2 to about 3), appears to promote selective removal of heavy metal ions such as Sb ($Sb^{5+}$) and As ($As^{3+}$).

Removal of excess Fe ($Fe^{2+}$) requires that suspension pH must be increased to above about 6, preferably via the addition of caustic.

Arsenic ($As^{3+}$) appears to be most effectively removed from the suspensions using ferric sulfate at low pH of about 3 in the presence of free ferric ion and with agitation times of at least about 30 minutes.

As noted above, antimony ($Sb^{5+}$) is removed from the suspensions using ferric sulfate at low pH (preferably a pH of about 3). The presence of ferric ion also appears to be important, with agitation (contact) times of between about 10 and about 30 minutes being preferred. In one embodiment, hydrogen peroxide ($H_2O_2$) is added at this stage.

Cadmium ($Cd^{+2}$) is removed from the suspension using the embodiments with attenuation of at least 90%. The best removal of Cd appears to be achieved at pH greater than about 4.5, preferably greater than about 6.0, even with initial Cd concentration of less than about 5.0 ppm. Agitation (contact) time for cadmium is at least about an hour.

Iron Fe ($Fe^{2+sup3+}$) is effectively removed from the suspension at neutral to slightly acidic conditions, preferably a pH of about 6. The final salt suspension must be at a pH above about 6 to reduce trace Fe from the liquid medium of the suspension.

Lead ($Pb^{2+}$) is effectively removed from the suspensions at a number of the stages of progressive neutralization, so particular pH adjustment is typically not needed for lead. In this regard, Pb is effectively removed with ferric sulfate across a pH range from about 2 to about 9.

Turning now to FIG. 1, a general apparatus 100 for contacting sodium sulfate crude solution with ferric sulfate, controlling the pH, and filtering the suspension is presented. Sodium sulfate crude solution 108 (having from about 28 percent to about 38 percent sodium sulfate in water) is added to vessel 120, and motor 118 is activated to power agitator 120. A bucket (e.g., five gallon capacity) of ferric sulfate 114 is added through pod 116, and sulfuric acid 110 is added to bring pH in the agitated suspension within vessel 102 to a value of about 3. Agitation is sustained for a period of about 30 minutes. Pump 122 is activated with valve 126 closed to fluid passage to circulate the suspension of vessel 102 past sampling valve 124. A sample is taken and the liquid medium of the suspension is tested for arsenic and antimony. If the antimony and arsenic in the liquid medium are collectively less than a first desired concentration (conducive to ultimate heavy metal impurities of less than about 10 parts per million in the final sodium sulfate crystals), sodium hydroxide 112 is added to incrementally adjust the pH of the suspension to a higher value, and the suspension is progressively neutralized by periodically incrementally increasing the pH of the suspension and agitating the suspension at each pH increment until a pH of greater than about 6 has eventually been sustained in agitation. As should be appreciated from the foregoing discussion, the progressive neutralization provides pH conditions and durations of agitation in the suspension so that iron, cadmium, and lead in the liquid medium test to he collectively less than a second desired concentration (conducive to ultimate heavy metal impurities of less than 10 parts per million in the final sodium sulfate crystals).

When the heavy metal impurities in a sample measure to a level where less than about 10 parts per million in the final sodium sulfate crystals is anticipated, valve 126 is opened and pump 122 transfers the suspension to filter 104 (a plate and frame filter) for separating $Fe_2(SO_4)_3$ sludge 128 from purified sodium sulfate solution 134. Purified sodium sulfate solution 134 is then pumped by pump 130 from holding vessel 106 for water removal (through conventional evaporation processes not shown, but which should be apparent).

EXAMPLES

A specified amount of ferric sulfate (both commercially available ferric sulfate is placed in the granular and liquid form) in 100 mL of aqueous sodium sulfate solution containing the specified initial metal ion concentrations at the specified pH. The pH is adjusted with either $Fe_2(SO_4)_3$ or $H_2SO_4$, and the temperature controlled at 23° C. The suspensions are stirred for the stated amount of time, after which caustic is used to raise the pH as described above. Then the solids are separated from their respective solutions by filtering with a grade 1 filter. The metal ion concentrations in the separated solutions are then determined analytically by Atomic Absorption.

Example 1

Attenuation of Lead 400 ml of sodium sulfate solution with an initial lead concentration of 201.6 and initial Sb concentration of 37 ppm is contacted with $FeSO_4$ for 0.5 hour with constant stirring. The pH is varied from 3 to 9. The results are presented in Table 2. Excellent removal is attained for Sb, Pb, and Fe, and effective remediation of $Pb^{2+}$, $Sb^{3+}$, and $Sb^{5+}$ is achieved.

TABLE 2

| PH | Pb | Sb | Fe |
|---|---|---|---|
| 3 | 79.0 | 37.0 | 19.9 |
| 4 | 62.0 | 6.5 | 17.1 |
| 5 | 36.0 | 5.0 | 0.24 |
| 6 | 9.1 | 4.6 | 0.0 |
| 7 | 2.3 | 4.5 | 0.0 |
| 8 | 0.0 | 4.4 | 0.0 |

Example 2

The effect of the ferric sulfate on the impurity concentration of the final product is determined by agitating 1500 mL of $Na_2(SO_4)$ solution containing 146.6 Pb, 0.40 Fe, and 9.44 Sb, with ferric sulfate.

TABLE 3

Steps of the Harper Process, and assays on salt product

| Ferric | pH | Caustic | Sb | Fe | Pb |
|---|---|---|---|---|---|
| 4 mL | 3.0 | None | | | |
| None | 7.5 | Yes | 4.2 | 0 | 0.4 |
| None | 8.0 | Yes | 2.8 | 0 | 0.1 |

The sodium sulfate solution is then boiled to crystallization, resulting in a salt with assay of 0.36 Pb, 0.0 Fe, and 1.0 Sb.

Example 3

Effect of Peroxide Addition

A 100 mL solution of Na SO4 solution with a starting assay of 0.0 Pb, 0.0 Fe, and 112.8 Sb is treated with ferric sulfate. The suspensions are stirred for the stated amount of time, after which caustic is used to raise the pH. Then the solids are separated from their respective solutions by filtering with a grade 1 filter. The metal ion concentrations in the separated solutions are then determined analytically. Peroxide is added at 3.5 ph and stirred for 30 minutes. Final assay: Pb 0.0, Sb 3.5, Fe 3.5 ppm. Salt produced from this sample is clean and white.

TABLE 4

| Ferric | Sulfuric | Ph | Caustic | Sb | Fe | Pb |
|---|---|---|---|---|---|---|
| 5 mL | | 5.0 | None | | | |
| | Yes | 3.5 | None | 4.2 | 0 | 0.4 |
| 5 MI | | 2.6 | None | 2.8 | 0 | 0.1 |

The examples and other embodiments described herein are exemplary and not intended to be limiting in describing the full scope of compositions and methods of this invention. Equivalent changes, modifications and variations of specific embodiments, materials, compositions and methods may be made within the scope of the present invention, with substantially similar results.

What is claimed is:

1. A method for purifying aqueous crude sodium sulfate solution having from about 28 weight percent to about 38 weight percent sodium sulfate and at least one heavy metal impurity selected from the group of metals consisting of antimony, arsenic, iron, cadmium, lead, and combinations thereof, said method comprising:
    (a) adding ferric sulfate to said aqueous crude sodium sulfate solution to form a suspension;
    (b) progressively neutralizing said suspension from a pH of less than about 3.5 to a pH of greater than about 6 to form precipitate of ferric sulfate and said at least one heavy metal impurity, said progressively neutralizing comprising agitating said suspension at sustained pH increments, said progressively neutralizing further comprising testing a sample of said suspension for residual heavy metal impurities at a pH increment before incrementing said pH to a new pH increment in said suspension; and
    (c) separating said precipitate from said suspension.

2. The method of claim 1 wherein said separating comprises filtering.

3. The method according to claim 1 wherein said progressively neutralizing further comprises agitating said suspension at a sustained pH of about 2.

4. The method according to claim 1 wherein said progressively neutralizing further comprises agitating said suspension at a sustained pH of about 3.

5. The method according to claim 1 wherein said progressively neutralizing further comprises agitating said suspension at a sustained pH of about 4.

6. The method according to claim 1 wherein said progressively neutralizing further comprises agitating said suspension at a sustained pH of about 5.

7. The method according to claim 1 wherein said progressively neutralizing further comprises agitating said suspension at a sustained pH of about 6.

8. The method according to claim 1 wherein said progressively neutralizing further comprises agitating said suspension at a sustained pH of about 7.

9. The method according to claim 1 wherein said progressively neutralizing further comprises agitating said suspension at a sustained pH of about 8.

10. The method according to claim 1 wherein said progressively neutralizing further comprises adding sodium hydroxide to said suspension to incrementally increase said pH.

11. The method according to claim 1 wherein said progressively neutralizing further comprises agitating said suspension at a sustained pH sufficient for adsorbing essentially all of any said antimony in said crude sodium sulfate solution into said precipitate.

12. The method according to claim 1 wherein said progressively neutralizing further comprises agitating said suspension at a sustained pH sufficient for adsorbing essentially all of any said arsenic in said crude sodium sulfate solution into said precipitate.

13. The method according to claim 1 wherein said progressively neutralizing further comprises agitating said suspension at a sustained pH sufficient for adsorbing essentially all of any said lead in said crude sodium sulfate solution into said precipitate.

14. The method according to claim 1 wherein said progressively neutralizing further comprises agitating said suspension at a sustained pH sufficient for adsorbing essentially all of any said iron in said crude sodium sulfate solution into said precipitate.

15. The method according to claim 1 wherein said progressively neutralizing further comprises agitating said suspension at a sustained pH sufficient for adsorbing essentially all of any said cadmium in said crude sodium sulfate solution into said precipitate.

16. A method for purifying aqueous crude sodium sulfate solution having from about 28 weight percent to about 38 weight percent sodium sulfate and at least one heavy metal impurity selected from the group of metals consisting of antimony, arsenic, iron, cadmium, lead, and combinations thereof, said method comprising:
  (a) adding ferric sulfate to said aqueous crude sodium sulfate solution to form a suspension;
  (b) progressively neutralizing said suspension from a pH of less than about 3.5 to a pH of greater than about 6 to form precipitate of ferric sulfate and said at least one heavy metal impurity, said progressively neutralizing further comprising admixing an oxidizing agent into said suspension; and
  (c) separating said precipitate from said suspension.

17. The method according to claim 16 wherein said progressively neutralizing further comprises admixing $H_2O_2$ into said suspension.

18. A method for making food grade sodium sulfate crystals comprising:
  (a) preparing crude sodium sulfate solution having from about 28 weight percent to about 38 weight percent sodium sulfate in water, said crude sodium sulfate solution having greater than 10 parts per million of at least one heavy metal impurity selected from the group of metals consisting of antimony, arsenic, iron cadmium, lead, and combinations thereof;
  (b) admixing ferric sulfate with said crude sodium sulfate to form a suspension of ferric sulfate in sodium sulfate liquid medium, said ferric sulfate admixed in a quantity sufficient for adsorbing said heavy metal impurity into a precipitate nucleated by said ferric sulfate so that less than 10 parts per million of said heavy metal impurity proportionate to said sodium sulfate remains in said liquid medium;
  (c) adjusting pH to less than about 3.5 in said suspension;
  (d) agitating said suspension to maintain said precipitate in suspension until antimony and arsenic in said liquid medium are collectively less than a first desired concentration;
  (e) progressively neutralizing said suspension by periodically incrementally increasing the pH of said suspension and agitating said suspension at each pH increment until a pH of greater than about 6 has eventually been sustained in agitation, said progressively neutralizing providing pH conditions and durations of agitation in said suspension so that iron, cadmium, and lead in said liquid medium are collectively less than a second desired concentration;
  (f) separating said precipitate from said liquid medium; and
  (g) removing water from said liquid medium to form sodium sulfate crystals;
  wherein said agitating and progressively neutralizing agitates said suspension at a plurality of sustained pH increments, said agitating and progressively neutralizing each further comprising testing a sample of said suspension for residual heavy metal impurities at a pH increment before incrementing said pH to a new pH increment in said suspension, said first and second desired concentrations in combination enable less than about 10 parts per million of said heavy metal impurity in said sodium sulfate crystals.

19. The method of claim 18 wherein said separating comprises filtering.

20. The method according to claim 18 wherein said adjusting further comprises adjusting pH to about 2.

21. The method according to claim 18 wherein said adjusting further comprises adjusting pH to about 3.

22. The method according to claim 18 wherein said progressively neutralizing further comprises agitating said suspension at a sustained pH of about 4.

23. The method according to claim 18 wherein said progressively neutralizing further comprises agitating said suspension at a sustained pH of about 5.

24. The method according to claim 18 wherein said progressively neutralizing further comprises agitating said suspension at a sustained pH of about 6.

25. The method according to claim 18 wherein said progressively neutralizing further comprises agitating said suspension at sustained pH of about 7.

26. The method according to claim 18 wherein said progressively neutralizing further comprises agitating said suspension at a sustained pH of about 8.

27. The method according to claim 18 wherein said agitating and progressively neutralizing each further comprise admixing an oxidizing agent into said suspension.

28. The method according to claim 18 wherein said agitating and progressively neutralizing each further comprise admixing $H_2O_2$ into said suspension.

29. The method according to claim 18 wherein said progressively neutralizing further comprises adding sodium hydroxide to increase the pH.

30. The method according to claim 18 wherein said progressively neutralizing further comprises agitating said suspension at a sustained pH sufficient for adsorbing essentially all of any said antimony in said crude sodium sulfate solution into said precipitate.

31. The method according to claim 18 wherein said progressively neutralizing further comprises agitating said suspension at a sustained pH sufficient for adsorbing essentially all of any said arsenic in said crude sodium sulfate solution into said precipitate.

32. The method according to claim 18 wherein said progressively neutralizing further comprises agitating said suspension at a sustained pH sufficient for adsorbing essentially all of any said lead in said crude sodium sulfate solution into said precipitate.

33. The method according to claim 18 wherein said progressively neutralizing further comprises agitating said suspension at a sustained pH sufficient for adsorbing essentially all of any said iron in said crude sodium sulfate solution into said precipitate.

34. The method according to claim 18 wherein said progressively neutralizing further comprises agitating said suspension at a sustained pH sufficient for adsorbing essentially all of any said cadmium in said crude sodium sulfate solution into said precipitate.

* * * * *